Jan. 21, 1941.  C. E. HODGKINS  2,229,567
ATTACHMENT FOR EYEGLASSES
Filed Dec. 27, 1939
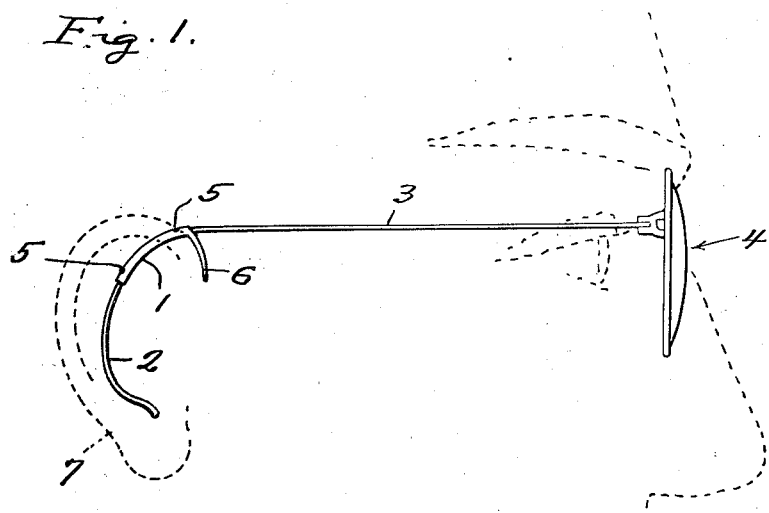
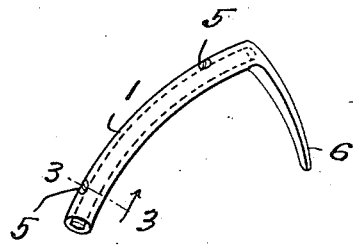
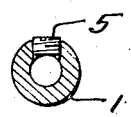
Inventor
Charles E. Hodgkins
By Clarence A. O'Brien
and Hyman Berman
Attorneys Patented Jan. 21, 1941

2,229,567

UNITED STATES PATENT OFFICE 2,229,567

ATTACHMENT FOR EYEGLASSES

Charles Edward Hodgkins, South Weymouth, Mass.

Application December 27, 1939, Serial No. 311,207

3 Claims. (Cl. 88—52)

The present invention relates to new and useful improvements in eyeglasses and has for its primary object to provide, in a manner as hereinafter set forth, an attachment comprising a novel construction and arrangement whereby the glasses will be securely but comfortably held in any fitted position.

Another very important object of the invention is to provide an attachment of the aforementioned character for eyeglasses which may be expeditiously adjusted to any desired position.

Still another very important object of the invention is to provide an attachment of the character described which may be conveniently mounted for use on conventional bows or temples without the necessity of making alterations therein.

Other objects of the invention are to provide an attachment for eyeglasses of the character set forth which will be comparatively simple in construction, strong, durable, highly efficient and reliable in use, compact, light in weight, inconspicuous and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation, showing an attachment constructed in accordance with the present invention in use.

Figure 2 is a perspective view of the device.

Figure 3 is a cross sectional view, taken substantially on the line 3—3 of Figure 2.

Referring now to the drawing in detail, it will be seen that the embodiment of the invention which has been illustrated comprises a longitudinally curved tube 1 of suitable material which is adapted to be slipped on the hook portion 2 of the temple 3 of the eyeglasses 4. It may be well to here state that one of the attachments is to be mounted on each temple of the eyeglasses.

The tube 1 is capable of sliding adjustment on the temple 3. Set screws 5 are provided in the end portions of the tube 1 for securing said tube in adjusted position on the temple.

Extending forwardly and downwardly from the forward end of the tube 1 is a finger 6. As illustrated to advantage in Figure 1 of the drawing the finger 6 is adapted to rest snugly against the frontal protrusion of the ear 7 where said ear joins the head.

When properly adjusted on the temple the device prevents backward and forward sliding of the nose piece on the glasses on the bridge of the nose and retains said glasses in any fitted position. A pair of properly fitted glasses may be worn indefinitely without causing soreness or skin abrasion at the bridge of the nose as the device functions as a lock for maintaining the original adjustment.

It is believed that the many advantages of an attachment for eyeglasses constructed in accordance with the present invention will be readily understood and although a preferred embodiment of the device is as illustrated and described, it is to be understood that changes in the details of construction may be resorted to which will fall within the scope of the invention as claimed.

What is claimed is:

1. A combined bearing member and locking finger for temples for eyeglasses comprising an arcuate tube positioned on the temple at the curve thereof adapted to rest on the top of the ear of a wearer between the ear and the adjacent portion of the wearer's head, and a depending locking finger formed integrally on said tube and adapted to engage the forward portion of the ear, whereby movement after the bearing member and locking finger are in operative position will be prevented.

2. The subject matter as set forth in claim 1, and said depending locking finger being forwardly bowed to conform to the shape of the forward portion of the wearer's ear.

3. The subject matter as set forth in claim 1, and securing means at the opposite ends of the arcuate bearing members for attaching the same to the temples.

CHARLES EDWARD HODGKINS.